Feb. 15, 1944.  E. DAVIS  2,341,696
MASTER VALVE LOCK FOR SERVOMOTORS
Filed June 9, 1942  3 Sheets-Sheet 2

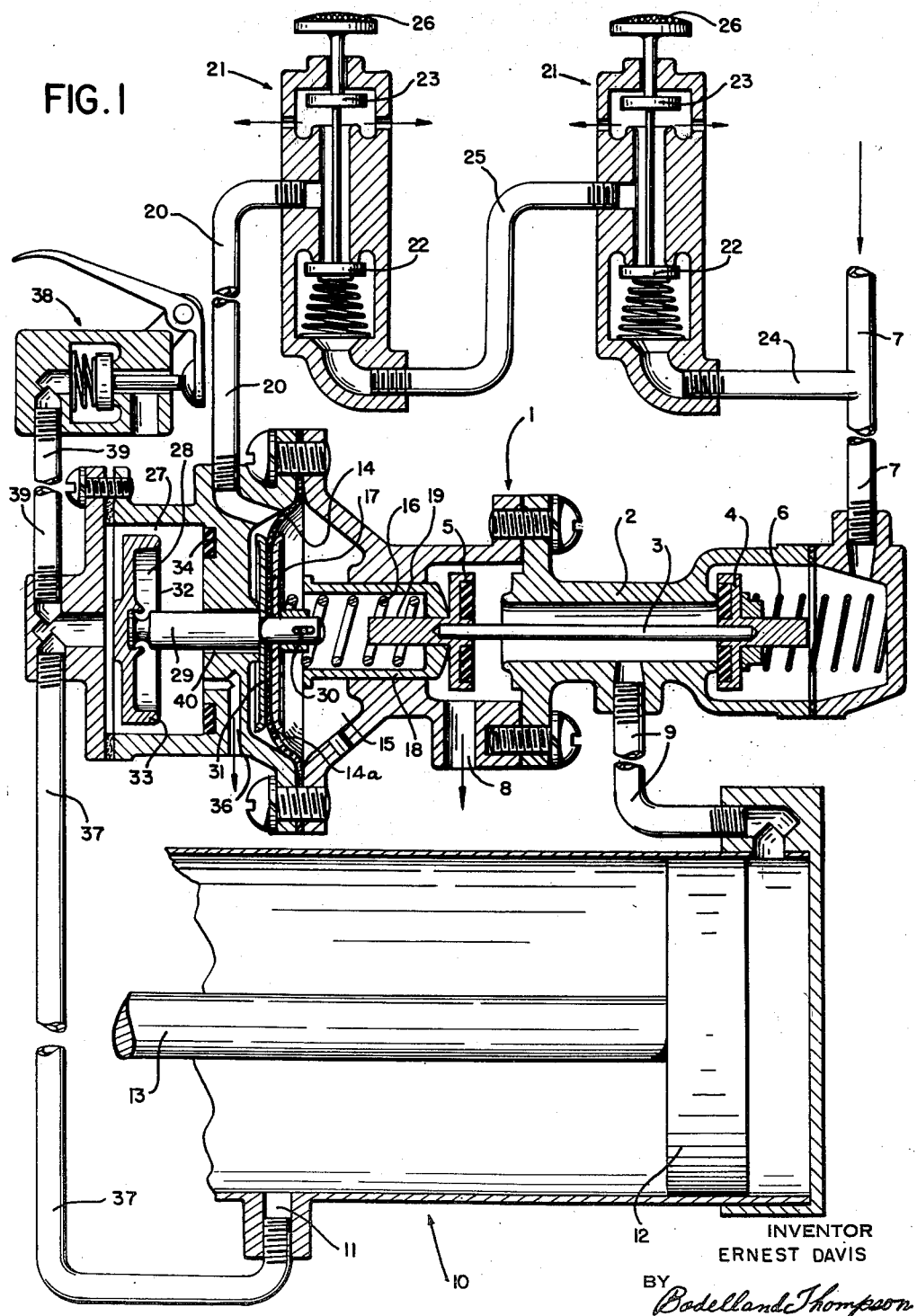

INVENTOR
ERNEST DAVIS
BY Bodell and Thompson
ATTORNEYS

INVENTOR
ERNEST DAVIS
BY
Bodell and Thompson
ATTORNEYS

Patented Feb. 15, 1944

2,341,696

UNITED STATES PATENT OFFICE 2,341,696

MASTER VALVE LOCK FOR SERVOMOTORS

Ernest Davis, Syracuse, N. Y., assignor to The Prosperity Company, Inc., Syracuse, N. Y., a corporation of New York Application June 9, 1942, Serial No. 446,388

12 Claims. (Cl. 121—38)

This invention relates to means for locking the master valves for servo-motors in their operated position, and has for its object a lock controlled in its operation by the movement of the servo-motor or some part operated thereby, and release means which, when operated, immediately releases the master valve, and prevents any unintentional repeated operations by the re-action of the pressure fluid in the fluid power system or by the rebuilding of pressure due to lag in exhaust when the manual exhaust valve is momentarily operated instead of being held open an appreciable time.

This valve lock is particularly applicable for locking the master valves of machines having an opening and closing movement, such as garment and laundry presses after the master valve has been initially opened by the operator, as by operating a two hand control where the master valve is timed and locked and by the operation of the motor or the machine which the motor serves. The valve lock usually is timed to operate when the machine is nearly closed.

The valve lock is here shown as applied to the servo-motor of the single acting cylinder and piston type and is operated by air pressure from the cylinder or from a port in the side of the cylinder arranged to be uncovered after the piston has traveled a predetermined distance. In such machines, the master valves have been held in unlocked position by a diaphragm, which is actuated by the delayed pressure passing to the diaphragm chamber after the machine served by the motor has operated or closed to a predetermined extent. To open such machines, the air is exhausted from the diaphragm chamber and the air exhausts back through the feed pipe to the diaphragm chamber, permitting the master valve to close its intake and also open its exhaust, the master valve being usually of the combined intake and exhaust type. In such installations, the operator should hold the release valve open for a predetermined time sufficient for the piston of the servo-motor to pass the port in the side of the cylinder, when the piston is on its retrograde movement. The retragrade movement, as will be understood, may be effected by countersprings. However, oftentimes the operator does not hold the release lever long enough, and hence the release valve would close before the piston head again passed the port on its retrograde movement, so that, although the exhaust of the master valve is open, the air on the pressure side of the piston in the cylinder would again build up sufficient pressure on the diaphragm to again operate the master valve, when the piston is only part way back in its retrograde movement. Such operation of the diaphragm results in the machine immediately closing again with danger to the operator.

The object of this invention is to take the locking operation away from the diaphragm and to effect the locking operation by a pressure-operated valve member, which may be released upon merely a touch of the release lever, and which, when initially released, opens up the chamber in which the valve is located to an open exhaust, in addition to the exhaust through the pipe, which ordinarily leads from the port in the side of the cylinder, so that the danger of unintentional repeated operation is eliminated.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view through the master valve, a two hand control mechanism being also shown, and the contiguous portion of the servo-motor being shown.

The invention comprises a pressure-operated device, as a diaphragm in a diaphragm chamber, for opening a master valve which controls the flow of pressure fluid, as air, from a suitable supply system to a servo-motor, pressure-operated means for holding the master valve in its operated position independently of the pressure-operated device or diaphragm, the flow of pressure fluid to the locking means being timed and controlled by the movement of the movable member or piston of the servo-motor, or some part operated thereby, this locking means including a valve of the poppet type located in a pressure chamber and normally spaced from and movable toward its seat upon the initial operation of the diaphragm, and pressed tightly against its seat by the pressure in the chamber in which the locking valve is located, the diaphragm being constructed so that the air leaks therethrough after the diaphragm has been given an initial impulse to open the master valve, so that the diaphragm is inert, in so far as holding open the master valve is concerned, the chamber in which the locking valve is located having an exhaust to the outer air, which is closed off by the seating of the locking valve and which is immediately opened to the exhaust of air upon the starting of the unseating movement of the locking valve, together with operator-releasable means, as an exhaust valve, for opening the chamber in which the locking valve is located, to the exhaust of air therefrom, so that upon initial opening of the operator-operated release valve, the air immediately releases and the master valve operates to cut off the servo-motor to the flow of air therethrough and to exhaust it to the outer air. The master valve is of the combined intake and exhaust type with its intake normally closed and its exhaust normally open, and owing to the locking valve, it is merely necessary for the operator to momentarily open the exhaust valve and not necessary to hold it open, as immediately upon the opening of this operator-operated exhaust valve, the locking valve unseats to open the locking valve chamber to the exhaust of air through the passage closed by the exhaust valve, when seated.

Figure 5:
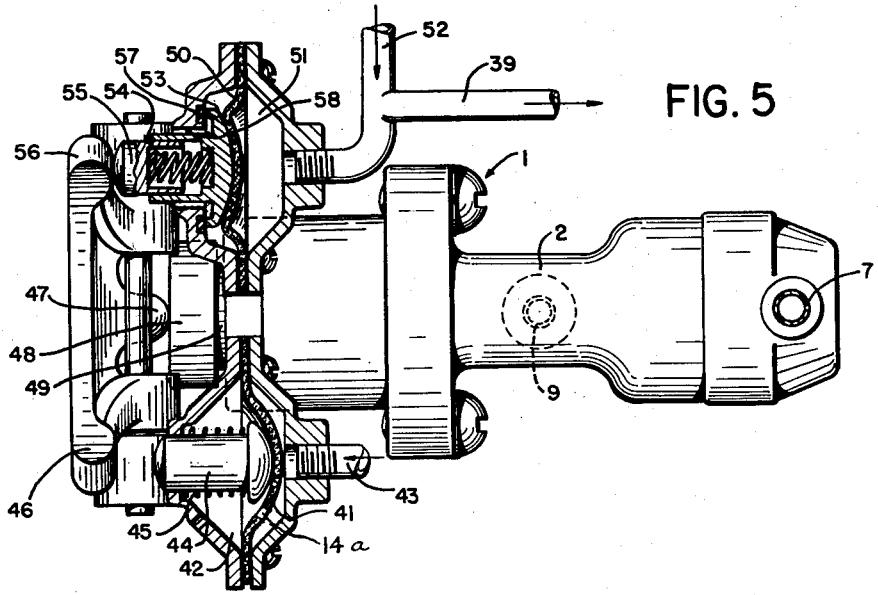
Figure 5 is a sectional view on line 5—5, Figure 4.
Figure 3:
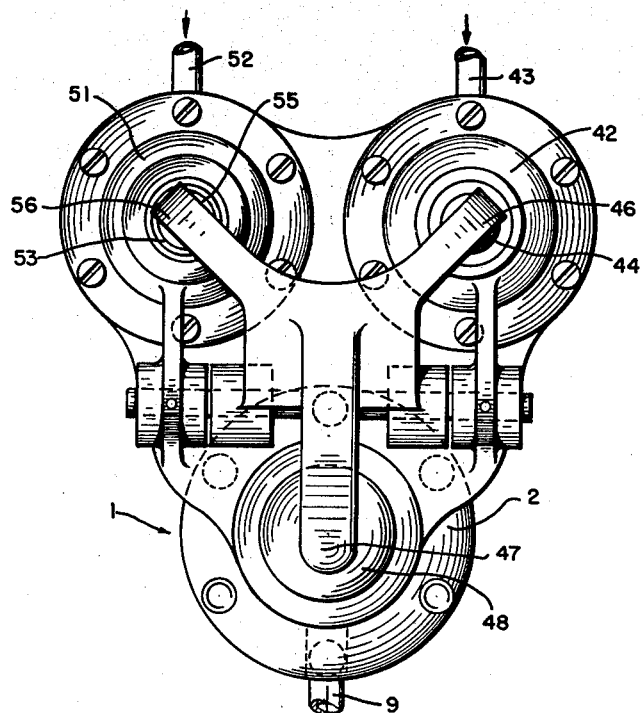
Figure 3 is an end view of a modified form of the master valve and locking means therefor.
Figure 4:
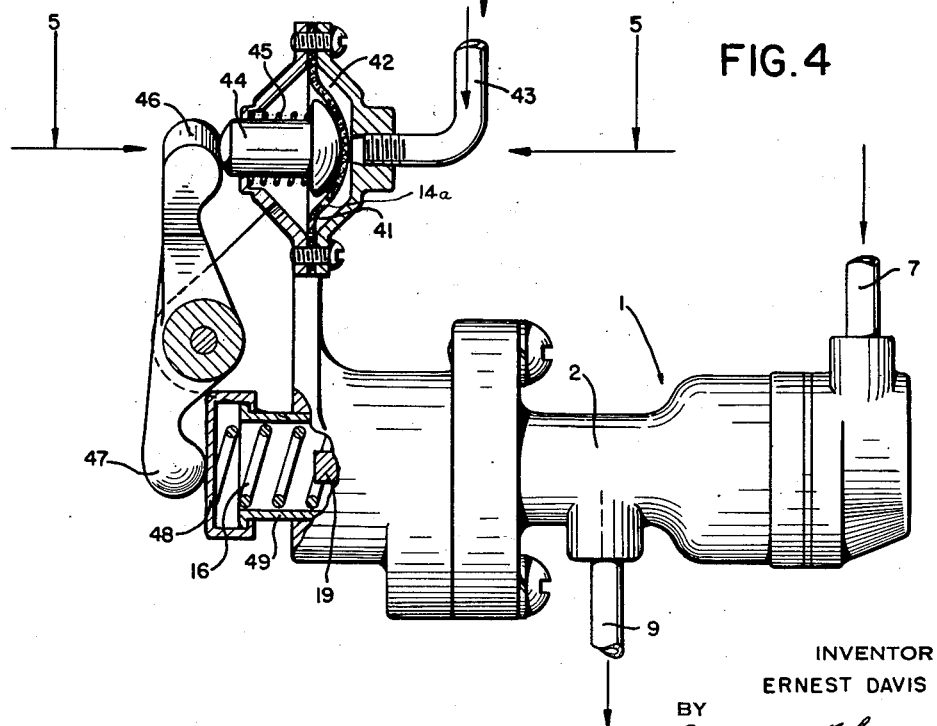
Figure 4 is an elevation partly in section looking to the right in Figure 3.

Two forms of the invention are shown. In Figure 1, one diaphragm, as 14, is used to both open the master valve and move the locking valve toward its seat before the chamber in which the locking valve is located, receives air pressure controlled by the servo-motor. In Figures 3, 4, and 5, one diaphragm is used to open the master valve, when the manual control, as two hand control, is operated, and another diaphragm, as 50, used to initially move the locking valve against its seat, this diaphragm being of pervious material to permit the air to filter therethrough and apply pressure to the head of the locking valve and hold it against its seat, so that the pressure equalizes on opposite sides of the diaphragm, and the pressure holding the valve against its seat is applied directly to the head of the locking valve, after this valve has been seated. In both instances, the opening of the release valve, opens the exhaust to the chamber or space having the seat for the locking valve, permitting the valve to immediately unseat and open such chamber or space to the exhaust of air without the necessity of holding the operator-operated release valve open. The pervious quality of the material or the construction of the diaphragm to permit the air to pass therethrough after the diaphragm has been given an operating impulse, is shown as a small leak port 14a.

Figure 2:
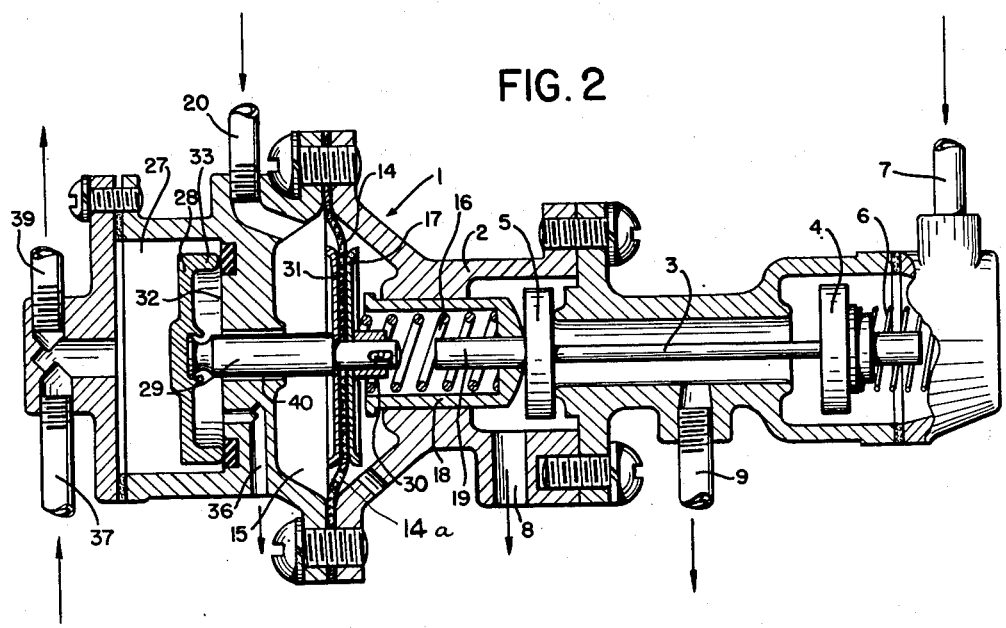
Figure 2 is a view showing the master valve in Figure 1 in its operated position.

In the form shown in Figures 1 and 2, the diaphragm 14 is also pervious, as the air pressure applied to one side thereof to give the impulse thereto upon the operation of the manual or two hand control, filters through the diaphragm and exhausts to the outer air, so that this diaphragm becomes inert after the locking valve seats.

In both instances, any back build up of pressure, after the release valve has been operated, can not build up to operate the master valve, and cause repeated operation, upon one operation of the manual or two hand control.

1 designates the master valve as a whole, this being of the combined intake and exhaust type and having a casing 2 and a movable valve member 3 therein provided with a normally-closed intake valve head 4 and a normally-open exhaust valve head 5 connected together to act as a unit. The valve member 3 is self-returnable, it being acted upon by a suitable spring 6 to return it to its normal position. The intake end of the valve casing 2 communicates with an intake pipe 7 for a pressure fluid, as air. The exhaust end of the casing has an exhaust passage 8 to the outer air controlled by the valve head 5. The intermediate part of the casing 2 between the heads of the valve, as 4, 5, is provided with a pipe 9 to the intake end of the cylinder 10 of the servo-motor. The cylinder has a port 11 in the side thereof arranged to be passed by the piston 12, when the piston has been actuated a predetermined distance on its power stroke. The piston rod 13 is connected to suitable motion transmitting mechanism to effect the operation of the machine, as to effect the operation of the press head of a pressing machine. The piston is single acting and is returned by counter-springs or weights embodied in the machine to which the servo-motor is applied.

The means for operating the movable member 3 of the master valve to open the intake valve head 4 and close the exhaust valve head 5 is here shown as a pressure-operated device, as a diaphragm located in a diaphragm chamber with the flow of pressure fluid, as compressed air, to the pressure side of the diaphragm being controlled by a two hand control. 14 designates the diaphragm located in the diaphragm chamber 15, the diaphragm acting on the valve member 3 through yielding means, as a spring 16, to close the exhaust valve head 5 of the master valve and open the intake head 4. The spring thrusts at one end against the diaphragm or a disk 17, reinforcing the central portion of the diaphragm, and against the bottom of a hollow abutment 18 slidably mounted in the valve casing and thrusting against the exhaust valve head 5. The spring thus tends to return the diaphragm to starting position. The valve head 5 has a stem 19 extending axially into the abutment 18 through the head of the abutment, so that the exhaust valve head 5 is centered in its shifting movement. The diaphragm is of a porous material or has a small leak port therethrough instead of being tight, and hence the air slowly exhausts or leaks out of the pressure side of the diaphragm chamber after the diaphragm has been given an operating impulse by a sudden rush of air when the control valves are operated. In short, after the operating impulse, the diaphragm is disabled by the leakage of air through the diaphragm. The air for operating the diaphragm enters the diaphragm chamber 15 from a pipe 20 connected to the main line air conduit 7 through a pair of manually-operated valves connected in series between the pipe 20 and the pipe 7.

21 designates the two hand control valves. Each is of the combined intake and exhaust type having a normally-closed, spring-pressed intake valve head 22 and a normally-open exhaust valve head 23. The intake end of one control valve casing is connected by a pipe 24 to the main intake pipe 7, the outlet of this valve being connected by a pipe 25 to the intake end of the other valve casing. The latter valve casing communicates with the diaphragm chamber 15 through the pipe 20. The construction of the two hand controls form no part of this invention, and any suitable two hand control mechanism may be used. The movable valve members of the two hand control valves are operated by manuals 26. When both manuals 26 are operated, the air flows from the main line 7 through the valves 21 and pipe 20 to the diaphragm chamber, actuating the diaphragm 14 from the position shown in Figure 1 to that shown in Figure 2, thus opening the intake head 4 of the master valve and closing the exhaust valve head 5, so that the air passes from the main pipe 7 through the master valve 2 and pipe 9 to the cylinder 10 of the servomotor to actuate the piston 12 therein. Heretofore, anything performing the function of the diaphragm 14 has been of special construction, which will hold air. In this construction, the diaphragm may be pervious or porous as cloth or canvas, as the only function it has to perform is to hold the momentary impulse of air to operate the master valve, the holding of the master valve in its operated position being performed by the locking means to be presently described.

The master valve locking means includes a pressure chamber 27 and a valve 28 of the mushroom type therein having its stem 29 connected to the diaphragm 14 by a lost motion, or pin-and-slot connection at 30, the stem having a shoulder abutting against a reinforcing disk 31 for the diaphragm similar to the disk 17. The valve 28, although it does not engage the sides of the chamber 27 but is spaced therefrom, nevertheless acts as a piston valve, or is pressure-operated, due to unequal pressures on opposite sides thereof. The valve 28 has an annular flange 32, the edge 33 of which coacts with the valve seat 34, at the bottom of the chamber concentric with the stem 29. The stem sliding fits a bore at the bottom of the chamber. The differential pressure is due to an exhaust 36 to the outer air and opening in the bottom of the chamber 27 within the valve seat 34. The pressure chamber 27 is connected by a pipe 37 to the port 11. The air is released from the pressure chamber 27 by a normally-closed, manually-operable release valve 38 connected by a pipe 39 to the chamber 27, it being here shown as connected to the pipe 37 which is a combined intake and exhaust pipe.

In operation, when the two hand control manuals 26 are operated, the air passing from the main line 7 through the two hand control valves 21 and pipe 20 to the diaphragm chamber 15 actuates the diaphragm 14 from the position shown in Figure 1 to that shown in Figure 2, and in so doing first takes up the lost motion at 30, and then moves the lock valve 28 down lightly on its seat 34. This operation of the diaphragm 14 also operates the master valve to open the intake valve head 4 and close the exhaust valve head 5, the motion of the diaphragm being transferred through the spring 16. Thus, air enters the cylinder 10 and actuates the piston 12 therein to effect the operation of the machine, as the closing of a press. When the piston has traveled a predetermined distance, as far enough to bring the press into closed position or nearly closed position, the piston uncovers the port 11, whereby the air from the cylinder 10 passes through the pipe 37 into the pressure chamber 27 and forces the valve 28 tightly against its seat 34, thus holding the master valve in its operated position independently of the two hand control. The air behind the diaphragm which is pervious or porous dissipates after the initial impulse through the diaphragm, to the non-pressure side of the diaphragm and out through the vent opening in the wall of the chamber 15. If the operator still holds the manuals 26 depressed after the master valve has been locked in its operated position, by reason of the valve 28, the air pressure passing into the diaphragm chamber through the pipe 20 may also leak out along the sliding clearance at 40 between the stem 29 and the bore in the bottom of the chamber 27 in which the stem slides, and thence out through the exhaust 36 without building up pressure against the valve 28 in opposition to the pressure through the pipe 37. To restore the master valve 2 to its normal position, in which the intake head 4 is closed and the exhaust head 5 open, and thus permit the air to exhaust from the cylinder 10, the operator opens the release valve 38, and it is necessary to hold it open only momentarily. The opening of the release valve 38 permits the valve 28 to separate from its valve seat 34, and even though this separation is very slight, it is sufficient to permit the air to exhaust from the chamber 27 through the exhaust 36, before the port 11 is uncovered by the piston on the retrograde movement of the piston, or in other words, because of the exhaust 36, a momentary opening of the release valve 28 is sufficient and prevents resetting of the valve 28 by any back pressure or pressure built up through the pipe 37 before the piston 12 has passed the port 11 on its retrograde movement. Upon the release of air from the chamber 27, the spring 36 will restore the diaphragm 14 to the position shown in Figure 1.

In Figures 3, 4 and 5, a modified form is shown in which the locking means includes a diaphragm and a different diaphragm or independent of the diaphragm which operates the master valve. In these figures, the master valve, the diaphragm and its chamber for initially operating it and the diaphragm and its chamber for locking it in its operated position are arranged in triangular formation. The master valve is of the same construction as shown in Figure 1, and the same reference numerals are applied thereto. In Figures 3, 4 and 5, 41 designates the diaphragm, and 42 the diaphragm chamber, corresponding to the diaphragm 14 and diaphragm 15 (Figure 1), and the air controlled by the two hand control enters the diaphragm chamber through pipe 43. The diaphragm 41 acts on a plunger 44 against the action of a spring 45, and this plunger coacts with one arm 46 of a Y-shaped lever pivoted to the triangular formation. The leg 47 of the Y-formation thrusts against head 48 on an abutment 49 corresponding to the abutment 18 in Figures 1 and 2. 50 designates the locking diaphragm, and 51 the diaphragm chamber in which it is located, this chamber being connected through the pipe 52 to the port in the side of the cylinder. The diaphragm 50 thrusts against the head of a valve 53 which preferably transfers its movement through a spring 54 to a sliding head 55 telescoping into the stem of the valve 53, the head thrusting against the other arm 56 of the Y-shaped lever, the valve head 53 coacting with a seat 57 in the same way that the valve 28 coacts with the seat 34 (Figures 1 and 2).

When the two hand control is operated, the air passes through the pipe 43 to the diaphragm chamber 42 actuating the diaphragm 41 therein, which in turn through the plunger 44 actuates the Y-shaped lever to cause the leg 47 thereof to operate the master valve 2 to open the intake head 4 and close the exhaust valve head 5 and thus permit the air to pass from the main line 7 through the master valve and pipe 9 to the cylinder 10 to actuate the piston 12 therein. When the piston passes the port 11 in the side of the cylinder, the air passes through the pipe 52 to the diaphragm chamber 51, actuating the porous or leather diaphragm to press the valve 53 against its seat 57, the valve 53 in turn through the spring 54 pressing the sliding head 55 against the arm 56 of the Y-lever, thus holding the Y-lever in its operated position, and hence holding the master valve 2 in its operated position. The air on the pressure side of the diaphragm 50 after the initial sudden impulse works through the pervious diaphragm and acts directly on the valve head 53 to hold it on the seat 57. Upon opening of the release valve, the air is instantly released from the diaphragm chamber 51 and any built up or back pressure, before the piston 12 passes the port 11 in its retrograde movement, passes around the valve 53, which is unseated, and the stem thereof, to the outer air, or an outlet 58 may be provided similar to the outlet 36 (Figure 1). Because of the looseness of the sliding fit of the stem of the valve 53 in its guide passage, a special outlet as 58 is not necessary.

What I claim is:

1. The combination with a pressure-operated servo-motor and an air supply system therefor; of a master valve for controlling the flow of pressure fluid to the motor, operator-operated means for controlling the opening of the master valve including a pressure-operated device, and operator-releasable, pressure-operated locking means connected in said system and controlled by the servo-motor when actuated a predetermined amount to hold the master valve in its operated position independently of the pressure-operated device, the pressure-operated device including a diaphragm chamber and a diaphragm therein, and the locking means including a poppet valve and a chamber in which it is located having a seat therefor, the poppet valve coacting with the diaphragm to be initially moved thereby toward its seat, the chamber in which the poppet valve is located being connected in the air system, and the flow of air thereto being controlled by the servo-motor.

2. The combination with a pressure-operated servo-motor and an air supply system therefor; of a master valve for controlling the flow of pressure fluid to the motor, operator-operated means for controlling the opening of the master valve including a pressure-operated device, and operator-releasable, pressure-operated locking means connected in said system and controlled by the servo-motor when actuated a predetermined amount to hold the master valve in its operated position independently of the pressure-operated device, the pressure-operated device including a diaphragm chamber and a diaphragm therein of pervious material to permit the air under pressure to pass therethrough, and the locking means including a poppet valve and a chamber in which it is located having a seat therefor, the poppet valve coacting with the diaphragm to be initially moved thereby toward its seat, the diaphragm chamber being connected in the air system and the flow of air thereto being controlled by the servo-motor, the diaphragm chamber being provided with an open air outlet from within its valve seat.

3. The combination with a pressure-operated servo-motor and an air supply system therefor; of a master valve for controlling the flow of pressure fluid to the motor, operator-operated means for controlling the opening of the master valve including a pressure-operated device, and operator-releasable, pressure-operated locking means connected in said system and controlled by the servo-motor when actuated a predetermined amount to hold the master valve in its operated position independently of the pressure-operated device, the pressure-operated device including a diaphragm chamber and a diaphragm therein, and the locking means including a poppet valve and a chamber in which it is located having a seat therefor, the poppet valve coacting with the diaphragm to be initially moved thereby toward its seat, the chamber in which the poppet valve is located being connected in the air system and the flow of air thereto being controlled by the servo-motor, the chamber in which the poppet valve works being provided with an open air outlet from within its valve seat.

4. The combination with a pressure-operated servo-motor and an air supply system therefor; of a master valve for controlling the flow of pressure fluid to the motor, operator-operated means for controlling the opening of the master valve including a pressure-operated device, and operator-releasable, pressure-operated locking means connected in said system and controlled by the servo-motor when actuated a predetermined amount to hold the master valve in its operated position independently of the pressure-operated device, the pressure-operated device including a diaphragm chamber and a diaphragm therein, and the locking means including a poppet valve and a chamber in which it is located having a seat therefor, the poppet valve coacting with the diaphragm to be initially moved thereby toward its seat, the chamber in which the poppet valve is located being connected in the air system and the flow of air thereto being controlled by the servo-motor, the diaphragm being constructed to permit the air to pass therethrough after being given an additional operating impulse of air.

5. The combination with a pressure-operated servo-motor and an air supply system therefor; of a master valve for controlling the flow of pressure fluid to the motor, operator-operated means for controlling the opening of the master valve including a pressure-operated device, and operator-releasable, pressure operated locking means connected in said system and controlled by the servo-motor when actuated a predetermined amount to hold the master valve in its operated postion independently of the pressure-operated device, the pressure-operated device including a diaphragm chamber and a diaphragm therein, and the locking means including a poppet valve and a chamber in which it is located having a seat therefor, the poppet valve coacting with the diaphragm to be initially moved thereby toward its seat, the chamber in which the poppet valve is located being connected in the air system and the flow of air thereto being controlled by the servo-motor, the chamber in which the poppet valve works being provided with an open air outlet from within its valve seat, the diaphragm being constructed to permit the air to pass therethrough after being given an initial operating impulse of air.

6. The combination with a pressure-operated servo-motor; of a master valve for controlling the flow of pressure fluid to the motor, said valve being of the combined intake and exhaust type with the intake normally closed and the exhaust normally open, operator-operated control means for controlling the operating of the master valve including a pressure-operated device, operator-releasable locking means controlled by the servo-motor when actuated a predetermined amount to hold the master valve in its operated position independently of the operator-operated control means and the pressure device including a chamber, a pressure-operated valve member therein, a combined intake and exhaust pipe for said chamber, and means controlled by the operation of the servo-motor for timing and controlling the flow of pressure fluid to, and the exhaust from, the chamber through said pipe, said chamber having an exhaust independent of the exhaust through said pipe and closed from exhausting from the pressure side of said valve member when said valve member is in its operated position and openable to exhaust air from the chamber immediately upon the initial release of said valve member.

7. The combination with a pressure-operated servo-motor and an air system; of a master valve in said system having a self-releasable movable member of the combined intake and exhaust type, with the intake normally closed and the exhaust open for controlling the flow of pressure fluid to the motor, operator-operated means for controlling the opening of the intake of the master valve, including a diaphragm chamber having a diaphragm therein, means for transferring the movement of the diaphragm to the movable member of the master valve, operator-operated means for controlling the flow of fluid to the diaphragm chamber on the pressure side of the diaphragm, and operator-releasable, pressure-operated means controlled by the servo-motor to hold the diaphragm and the master valve in its operated position independently of the fluid pressure applied to the diaphragm, the diaphragm being constructed to permit the air under pressure to pass therethrough after the diaphragm has received the initial operating impulse of air.

8. The combination with a pressure-operated servo-motor; of a master valve for controlling the flow of pressure fluid to the motor including a movable, self-returnable member of the combined intake and exhaust type, with the intake normally closed and the exhaust open, operator-operated means for controlling the operation of the movable member including a diaphragm chamber having a diaphragm therein, means for transferring the movement of the diaphragm to the movable member of the master valve, operator-operated means for controlling the flow of fluid to the diaphragm chamber on the pressure side of the diaphragm, pressure-operated means controlled by the servo-motor to hold the diaphragm and the master valve in its operated position independently of the fluid pressure applied to the diaphragm including a pressure chamber, and a pressure-operated locking valve member in the chamber and thrusting against the diaphragm, the chamber having a seat for said valve member, the valve member being normally spaced from its seat, a combined intake and exhaust pipe for a pressure fluid communicating with the chamber, the flow therethrough being controlled by the operation of the servo-motor, the chamber having an open exhaust from the side of the valve member on which the valve seat is located, said exhaust being arranged to be closed by the valve member, when seated, to the exhaust of air from the chamber, and operator control means for initially releasing the pressure from said chamber.

9. The combination with a pressure-operated servo-motor and an air supply system therefor; of a master valve for controlling the flow of the pressure fluid to the motor, operator-operated means for controlling the opening of the master valve including a pressure-operated device and operator-releasable, pressure-operated locking means connected in said system and controlled by the servo-motor, when actuated a predetermined amount, to hold the master valve in its operated position independently of the pressure-operated device, said pressure-operated device including a chamber and a movable member therein and the locking means including a poppet valve and a chamber in which it is located having a seat therefor, the poppet valve coacting with the movable member to be initially moved thereby toward its seat, the chamber in which the poppet valve is located being connected in the air system and the flow of air thereto being controlled by the servo-motor.

10. The combination with a pressure-operated servo-motor and an air supply system therefor; of a master valve for controlling the flow of the pressure fluid to the motor, operator-operated means for controlling the opening of the master valve including a pressure-operated device and operator-releasable, pressure-operated locking means connected in said system and controlled by the servo-motor, when actuated a predetermined amount, to hold the master valve in its operated position independently of the pressure-operated device, said pressure-operated device including a chamber and a movable member therein and the locking means including a poppet valve and a chamber in which it is located having a seat therefor, the poppet valve coacting with the movable member to be initially moved thereby toward its seat, the chamber in which the poppet valve is located being connected in the air system and the flow of air thereto being controlled by the servo-motor, the pressure-operated device having a leak port leading from the pressure side of the movable member.

11. The combination with a pressure-operated servo-motor and an air supply system therefor; of a master valve for controlling the flow of pressure fluid to the motor, operator-operated means for controlling the opening of the master valve including a pressure-operated device, and operator-releasable, pressure-operated locking means connected in said system and controlled by the servo-motor when actuated a predetermined amount to hold the master valve in its operated position independently of the pressure-operated device, the pressure-operated device including a diaphragm chamber and a diaphragm therein, and the locking means including a poppet valve and a chamber in which it is located having a seat therefor, the poppet valve coacting with the diaphragm chamber to be initially moved thereby toward its seat, the chamber in which the poppet valve is located being connected in the air system, and the flow of air thereto being controlled by the servo-motor, the diaphragm chamber having a pressure-releasing leak opening from the pressure side thereof.

12. The combination with a pressure-operated servo-motor, of a master valve having a self-returnable movable member, of the combined intake and exhaust type normally arranged with the inlet closed and the exhaust open for controlling the flow of pressure fluid to the motor, operator-operated means for controlling the opening of the intake of the master valve and the closing of the exhaust including a pressure chamber having a movable, pressure-operated member therein, means for transferring the movement of said pressure-operated member to the movable member of the master valve, operator-operated means for controlling the flow of fluid to said chamber on the pressure side of the movable member therein, and operator releasable means controlled by the servo-motor to hold the movable member in said pressure chamber and the master valve in its operated position, including a release valve coacting with the movable member in said pressure chamber to be initially moved thereby to closed position, a chamber in which the release valve is located, connected in the air system and the flow of air thereto being controlled by the servo-motor, and a manually-operated valve located to exhaust the air from the release valve chamber, all whereby upon the momentary operation of the manually-operated valve, the release valve is unseated and the pressure fluid continues to exhaust even though the manually-operated valve again closes before the exhausting is completed.

ERNEST DAVIS.